(12) United States Patent
Ishida

(10) Patent No.: US 7,891,700 B2
(45) Date of Patent: Feb. 22, 2011

(54) AIRBAG FOR KNEE PROTECTION

(75) Inventor: Ryotaro Ishida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 85 days.

(21) Appl. No.: 12/457,218

(22) Filed: Jun. 4, 2009

(65) Prior Publication Data

US 2009/0302585 A1 Dec. 10, 2009

(30) Foreign Application Priority Data

Jun. 9, 2008 (JP) .............................. 2008-150980

(51) Int. Cl.
*B60R 21/231* (2006.01)
(52) U.S. Cl. .................. 280/730.1; 280/742; 280/743.2
(58) Field of Classification Search .............. 280/730.1, 280/731, 742, 743.1, 743.2
See application file for complete search history.

(56) References Cited

U.S. PATENT DOCUMENTS

| | | | | |
|---|---|---|---|---|
| 6,715,789 B2 * | 4/2004 | Mizuno et al. | ........... | 280/730.1 |
| 6,942,245 B2 * | 9/2005 | Takimoto et al. | ......... | 280/730.1 |
| 6,945,557 B2 * | 9/2005 | Takimoto et al. | ......... | 280/730.1 |
| 7,055,851 B2 * | 6/2006 | Takimoto et al. | ......... | 280/730.1 |
| 7,055,858 B2 * | 6/2006 | Takimoto et al. | ......... | 280/743.1 |
| 7,182,365 B2 * | 2/2007 | Takimoto et al. | ......... | 280/730.1 |
| 7,201,395 B2 * | 4/2007 | Nagata et al. | ............ | 280/730.1 |
| 7,314,232 B2 * | 1/2008 | Kashiwagi | ............... | 280/730.1 |
| 7,350,801 B2 * | 4/2008 | Nakayama | ............... | 280/730.1 |
| 7,434,837 B2 * | 10/2008 | Hotta et al. | .............. | 280/743.2 |
| 7,571,929 B2 * | 8/2009 | Fukawatase et al. | ..... | 280/730.1 |
| 7,578,517 B2 * | 8/2009 | Fukawatase et al. | ..... | 280/730.1 |
| 7,604,250 B2 * | 10/2009 | Hotta et al. | .............. | 280/728.2 |

FOREIGN PATENT DOCUMENTS

| JP | 2003182504 A | * | 7/2003 |
|---|---|---|---|
| JP | 2003267178 A | * | 9/2003 |
| JP | A-2003-291761 | | 10/2003 |

\* cited by examiner

*Primary Examiner*—Paul N Dickson
*Assistant Examiner*—Laura Freedman
(74) *Attorney, Agent, or Firm*—Posz Law Group, PLC

(57) ABSTRACT

An airbag for knee protection includes at the center in a left and right direction of the upper edge an accommodation recess that recesses downward for accommodating an underside of the column cover. An outer wall of the upper region of the airbag is comprised of a panel material that is doubled on a turn crease that extends straightly through the panel in a left and right direction and forms the upper edge of the airbag. The airbag further includes beneath the turn crease and in the vicinity of the center in a left and right direction of the upper panel and above the thickness regulating tether a connecting member that approximates the driver-side wall and column cover side wall of the airbag to each other so as to provide the accommodation recess. The connecting member is arranged to form a communication passage between the connecting member and the turn crease that allows inflation gas to flow through in a left and right direction.

7 Claims, 14 Drawing Sheets

AIRBAG FOR KNEE PROTECTION

The present application claims priority from Japanese Patent Application No. 2008-150980 of Ishida, filed on Jun. 9, 2008, the disclosure of which is hereby incorporated into the present application by reference.

BACKGROUND OF THE INVENTION

1. Field of the Invention

The present invention relates to an airbag suitable for use in a knee-protecting airbag apparatus for protecting knees of a seated driver in the event of impact of vehicle.

2. Description of the Related Art

JP2003-291761A discloses a conventional airbag for protecting knees of a driver by FIGS. 5 and 6. This airbag is folded up and housed in a lower area of a space in front of knees of a seated driver. The airbag has a gas source in the lower area as fully inflated, which lower area constitutes an upstream portion of inflation gas whereas the upper area as fully inflated constitutes a downstream portion of inflation gas. When fed with inflation gas, this airbag emerges from the housing toward the rear and deploys upward in such a manner as to cover the lower surface of the column cover which extends obliquely upward and rearward. The airbag includes on the left and right of the upper area facing away from the gas source knee-arresting portions inflatable to have enough thicknesses to cushion both knees. Below and between the left and right knee-arresting portions is a thickness-regulating tether that connects the driver-side wall and column cover side wall of the airbag that helps inflate the airbag in a plate fashion. The airbag further includes at the center in a left and right direction on the upper edge as fully inflated an accommodating recess that recesses downward for accommodating the underside of the column cover.

In the above conventional airbag, materials forming the driver-side wall and column cover side wall each has on the upper edge a recess that constitutes the accommodating recess, and the airbag is manufactured by connecting such materials together at outer peripheral edges by sewing or the like.

That is, manufacturing of the above conventional airbag involves cutting materials for forming the driver-side wall and column cover side wall in a curved manner for forming the recesses and sewing the materials in a curved fashion, which is troublesome.

Especially in the above airbag, whenever inflation gas flows through the upper area of the airbag (which is located on downstream of gas channel), hot and high-pressure gas flows along the upper edge of the airbag and hit the seam of the accommodating recess that recesses inward of the airbag. Considering this, double stitching has been applied to the seam to enhance durability, and which has further complicated manufacturing.

Moreover, if the inflator located in the lower area of the airbag has gas discharge ports at one side in a left and right direction, the gas exited the inflator firstly pushes the upper edge of the airbag at the side where the discharge ports are located and then flows toward the other side. If the materials forming the airbag are provided with recesses in the upper edge, the force of the gas that pushes the upper edge of the airbag at the side of the discharge ports is enhanced and thereby causing an imbalanced inflation in a left and right direction of the airbag.

SUMMARY OF THE INVENTION

The object of the present invention is to provide an airbag for knee protection that is easy to manufacture and is inflatable in a balanced manner in a left and right direction even in the event that the gas source is located on one side in a left and right direction.

The airbag of the invention is adapted to be mounted on a low location in front of a driver's seat in a folded-up state for emergence from a housing and deployment upward and rearward when fed with inflation gas in such a manner as to cover an underside of a column cover extending obliquely upward and rearward. A lower region of the airbag at full deployment constitutes an upstream portion proximate a source of inflation gas, whereas an upper region of the airbag at full deployment constitutes a downstream portion apart from the source of inflation gas. The airbag includes a driver-side wall deployable toward the driver's seat, a column cover side wall deployable toward the column cover, left and right knee-arresting portions, a thickness regulating tether and an accommodation recess. The knee-arresting portions are located on the left and right of the upper region of the airbag away from the gas source and are inflatable to have enough thicknesses for cushioning left and right knees of a driver. The thickness regulating tether is located beneath and between the knee-arresting portions and connects the driver-side wall and column cover side wall for helping shape the airbag in a plate-like fashion at full inflation. The accommodation recess is located at the center in a left and right direction of the upper edge of the airbag at full inflation and recesses downward for accommodating the underside of the column cover. The airbag of the invention further includes an upper panel and a connecting member. The upper panel is formed of a flexible sheet material and constitutes an outer wall of the upper region of the airbag. The upper panel is doubled on a turn crease that extends straightly through the panel in a left and right direction and forms the upper edge of the airbag. The connecting member is located beneath the turn crease and in the vicinity of the center in a left and right direction of the upper panel and above the thickness regulating tether. The connecting member approximates the driver-side wall and column cover side wall to each other so as to provide the accommodation recess and is arranged to form a communication passage between the connecting member and the turn crease that allows inflation gas to flow through in a left and right direction.

In the airbag of the invention, the accommodation recess for accommodating the underside of the column cover can be formed only by doubling up the upper panel on the turn crease and connecting the driver-side wall and column cover side wall by the connecting member below the turn crease and above the thickness regulating tether. That is, although the total film length of the driver-side wall and column cover side wall above the thickness regulating tether are the same at the location of the knee-arresting portion and at the location of the accommodation recess, the connecting member connects the walls together in such a manner as to tuck the walls in an anteroposterior direction, such that the walls are prevented from free expansion and a central region of the upper end of the airbag is suppressed from extending upward and forms into the accommodation recess at full inflation of the airbag.

Since the accommodation recess is formed only by doubling up the upper panel on the turn crease and connecting the driver-side wall and column cover side wall at a predetermined location above the thickness regulating tether by the connecting member, the airbag can be manufactured without applying double stitch to a curved upper edge of the airbag as is conventionally done.

Moreover, the airbag of the invention does not include any seams on the upper edge unlike conventional airbags that were manufactured by connecting the driver-side wall and column cover side wall together by outer peripheral edges, since the airbag is formed by the upper panel that is doubled up on the turn crease. This configuration gives the airbag an increased airtightness.

The accommodation recess forms a projecting portion at the interior of the upper edge of the airbag. Since this projecting portion is comprised only of the turn crease extending in a left and right direction, it is hardly resistant to the flow of inflation gas. Furthermore, since the connecting member is arranged inside the airbag to form the communication passage between the connecting member and the turn crease that allows free passage of inflation gas, the inflation gas smoothly flows in a left and right direction along the upper edge of the airbag. As a result, even in the event that an inflator has gas discharge ports at one side in a left and right direction in the upstream portion, and the gas flows into the downstream portion from that one side of the upstream portion, the gas flows smoothly in a left and right direction at the upper edge of the airbag, and therefore, the upper end region of the airbag unfurls and inflates as bilaterally evenly as possible.

Therefore, the airbag for knee protection of the invention is easy to manufacture and is inflatable in a bilaterally balanced manner even in the event that the gas source is located on one side in a left and right direction.

The connecting member may be comprised of sewing threads and/or adhesive that brings the driver-side wall and column cover side wall into direct contact with each other. However, it is desired that the connecting member is comprised of a recess-forming tether that is connected to the driver-side wall and column cover side wall by front and rear edges such that the driver-side wall and column cover side wall are separate from each other in an anteroposterior direction. This configuration provides an inflatable space between the driver-side wall and column cover side wall at the location of the connecting member, unlike the above instance where the walls are directly connected together, such that the knee-arresting portions are smoothly formed with a predetermined thickness proximate the connecting member. In other words, in such an instance where the walls of the airbag are connected into direct contact, an inflatable space cannot be formed between the walls at the location of the connecting member and knee-arresting portions will be thin in the vicinity of the connecting member. In order to make the knee-arresting portions thick enough in this instance, the airbag will have to be enlarged in width such that the knee-arresting portions will be located away from the connecting member. This will go against downsizing of airbags.

The recess-forming tether may be formed of a piece of fabric woven by warps and wefts. In this case, it is desired that seams that connect the front and rear edges of the recess-forming tether to the driver-side wall and column cover side wall are each comprised of a sewing line that extends along a left and right direction and generally perpendicularly to the bias direction of the fabric forming the recess-forming tether, and that the recess-forming tether includes on each of lateral edges a cutout portion that recesses toward the center in a left and right direction of the recess-forming tether relative to left/right terminals of the seams.

Upon airbag deployment, a great tension force acts on the recess-forming tether in such a manner as to pull the tether to the front and rear. However, the above configuration prevents the recess-forming tether from tearaway because the sewing lines that connect the tether to the walls of the airbag are arranged generally perpendicularly to the bias direction of the fabric, i.e. extend generally at 45° to the warps and wefts of the fabric, which allows stretching of the fabric or tether to some extent in an anteroposterior direction and cushioning of an abrupt tension force.

Moreover, due to the cutout portions formed on laterals of the recess-forming tether, upon airbag inflation, the tension force trying to pull the tether to the front and rear substantially acts on an area of the tether expanding between bottoms of the cutout portions. Accordingly, the tension force does not directly affects left and right terminals of the sewn seams since those terminals are located outward in a left and right direction relative to the bottoms of the cutout portions. That is, stress concentration which would otherwise occur on the terminals of the seams due to the tension force is mitigated and thereby improving the connecting strength of the recess-forming tether to the walls of the airbag.

In the instance where the connecting member is comprised of the recess-forming tether, the recess-forming tether is desirably smaller in width in a left and right direction than a distance between centers of the knee-arresting portions at full inflation of the airbag so as not to thin the thicknesses at the centers of the knee-arresting portion upon airbag inflation.

Moreover, in the instance where the connecting member is comprised of the recess-forming tether, the positions at which the front end and rear end of the recess-forming tether are connected to the driver-side wall and column cover side wall may be lowered and away from the turn crease so as to enlarge an opening area of the communication passage. However, locating the positions proximate the centers of the knee-arresting portions will lead to thinning of the central areas of the knee-arresting portions, and therefore, the front end and rear ends of the recess-forming tether, i.e. seams of the recess-forming tether and the walls of the airbag, are desirably located above the central areas of the knee-arresting portions.

The outer wall of the airbag may be formed of, in addition to the upper panel that constitutes upper regions of the driver-side wall and column cover side wall, a lower front panel that constitutes a lower region of the column cover side wall and a lower rear panel that constitutes a lower region of the driver-side wall. Each of the lower front panel and lower rear panel may be formed of further split panels split in a vertical direction.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
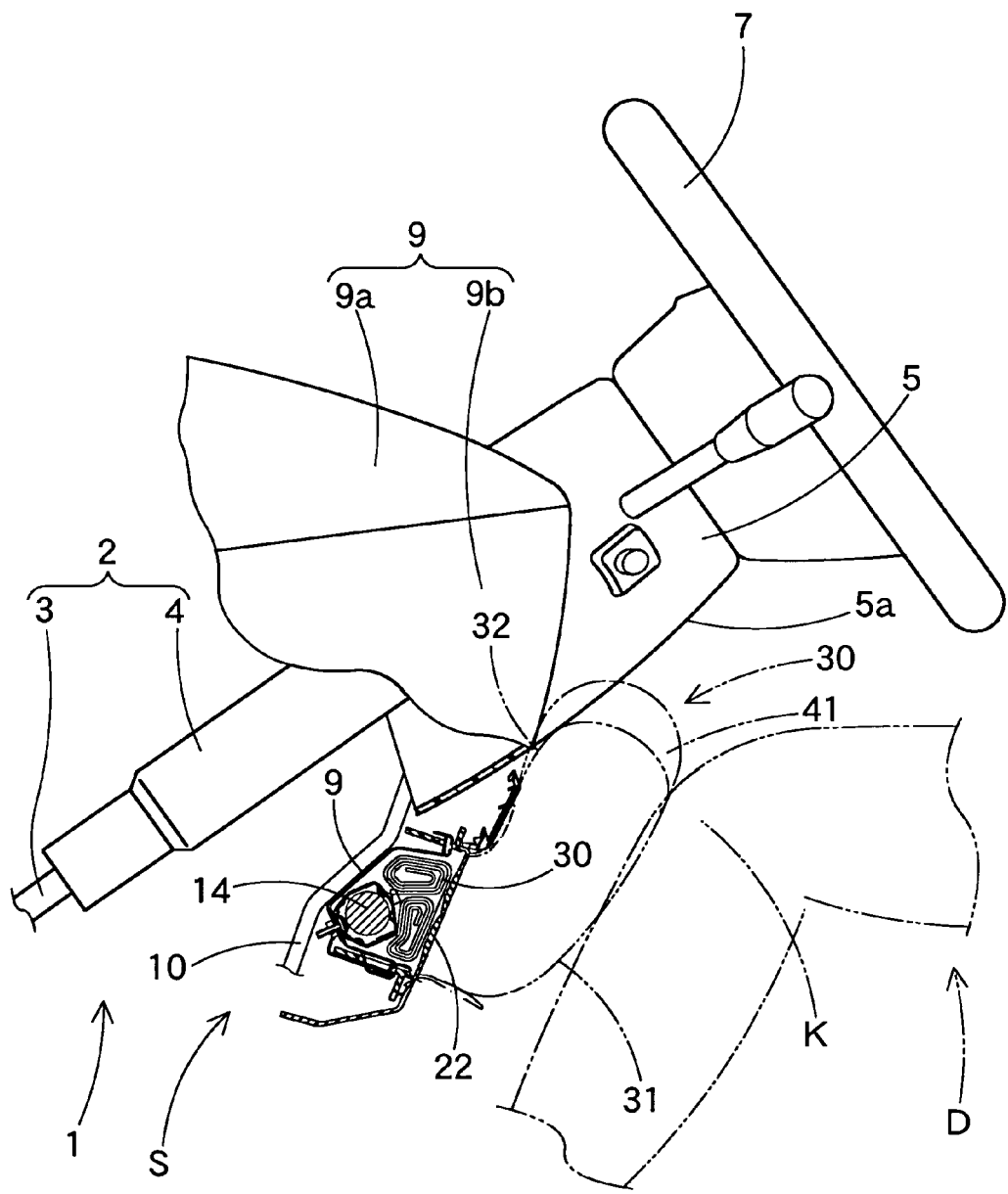
FIG. 1 is a schematic vertical section of a knee-protecting airbag apparatus employing an airbag embodying the invention as mounted on a vehicle.

An airbag 30 embodying the invention is adapted to be used in a knee-protecting airbag apparatus S shown in FIG. 1. The airbag apparatus S is located below the steering column 1 and in front of a driver's seat for protecting knees K of a driver D.

Figure 11:
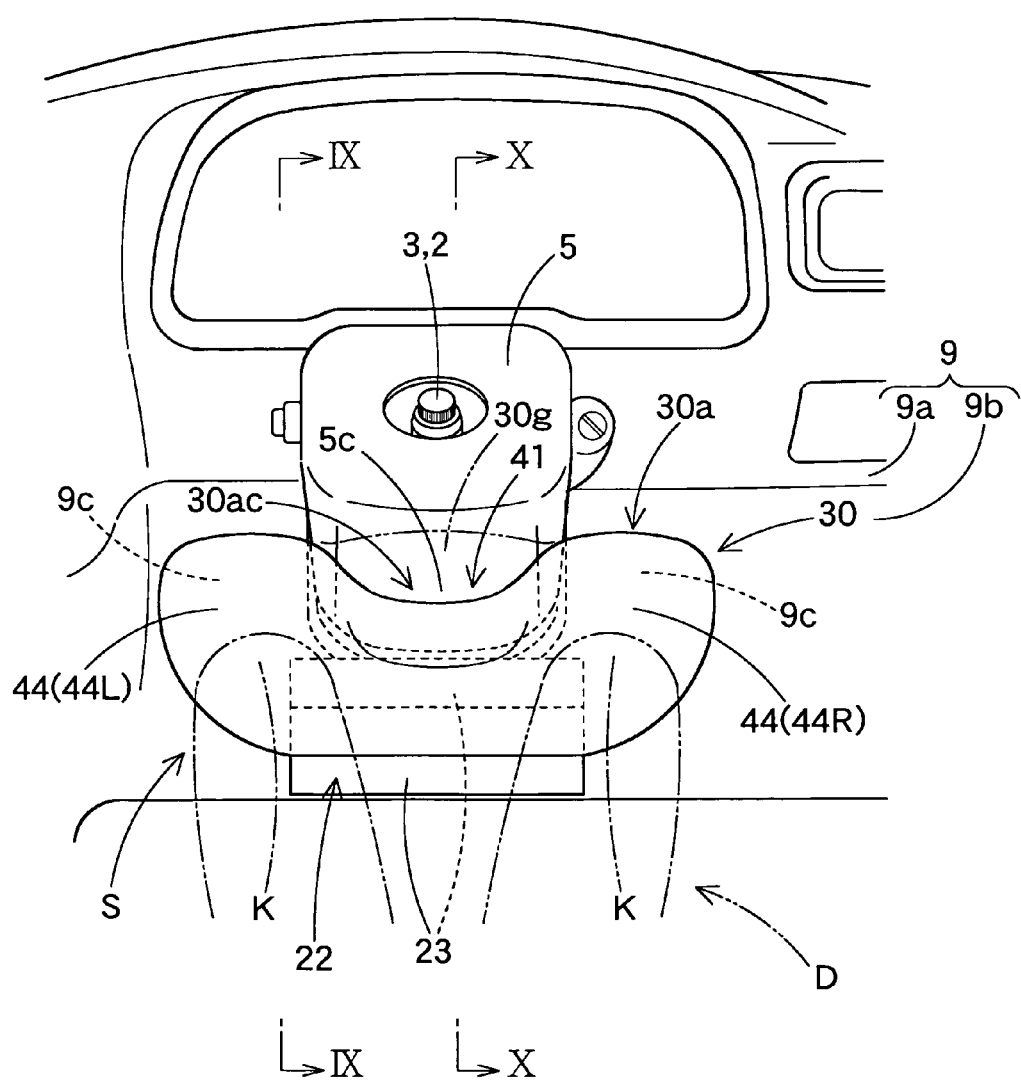
FIG. 11 is a front view of the airbag of FIG. 4 at full inflation as is mounted on a vehicle as viewed from the rear of the vehicle.

As shown in FIG. 1, the steering column 1 includes a column body 2 connected to the steering wheel 7 and a column cover 5 that covers the column body 2 below the steering wheel 7. The column body 2 includes a main shaft 3 and a column tube 4 mounted around the main shaft 3. The column cover 5 is made from synthetic resin and has a generally square tubular shape projecting rearward from the instrument panel or dashboard 9 while covering the column body 2 (FIG. 11). The column cover 5, together with the column body 2, extends obliquely upward and rearward and so does the underside 5a of the column cover 5.

Figure 2:
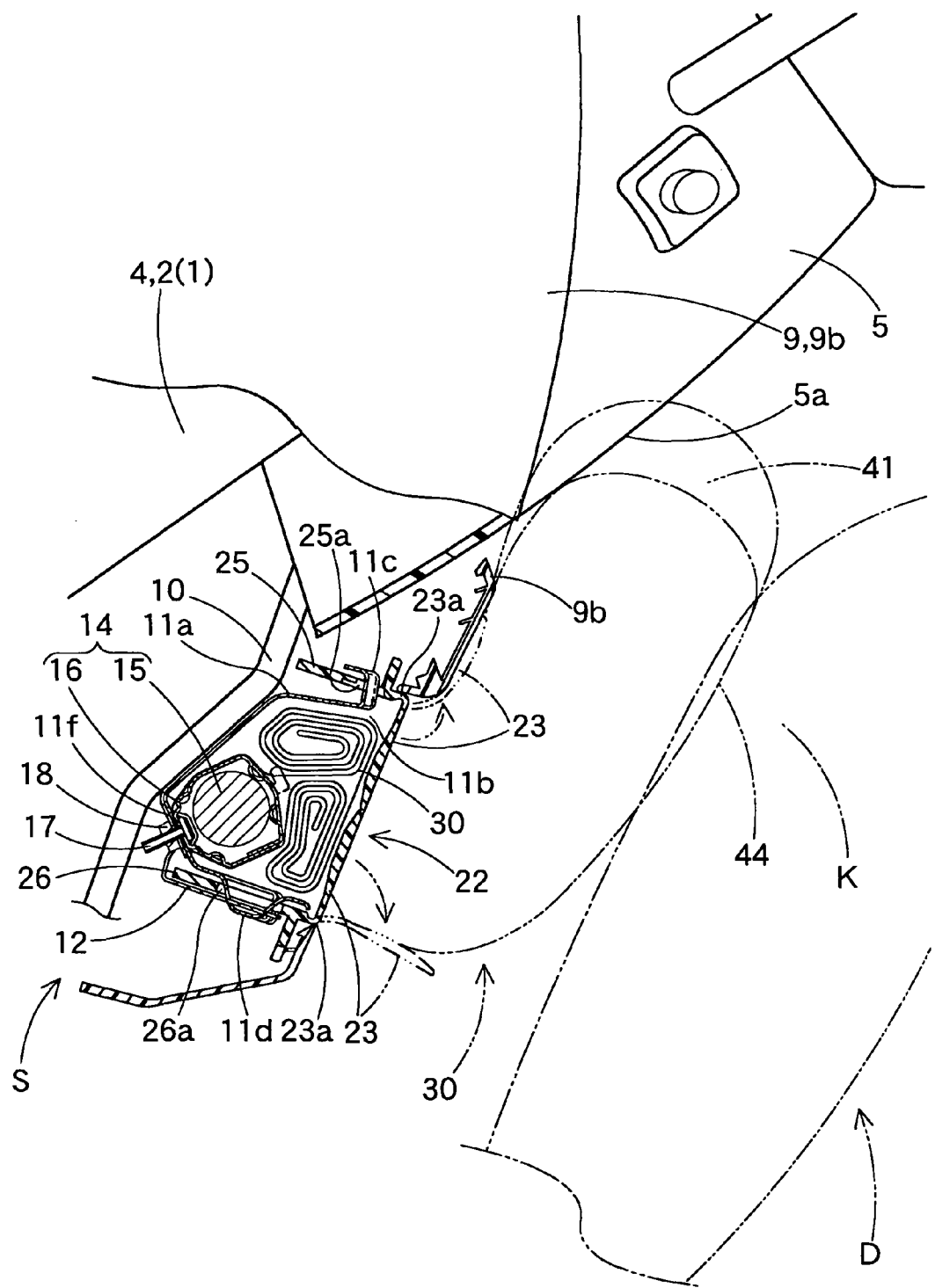
FIG. 2 is an enlarged schematic vertical section of the airbag apparatus of FIG. 1 as mounted on a vehicle.
Figure 3:
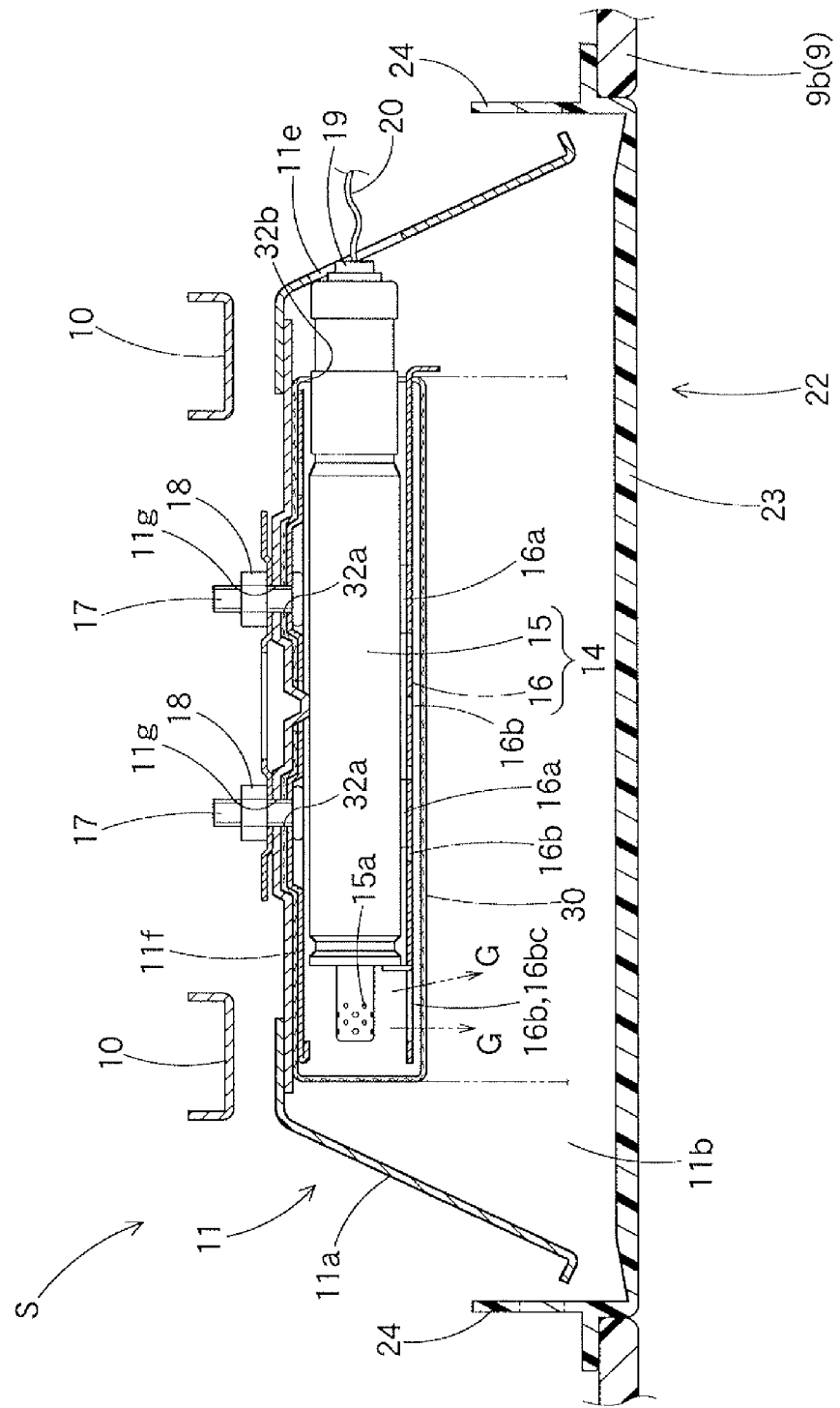
FIG. 3 is a schematic enlarged horizontal section of the airbag apparatus of FIG. 1 as mounted on a vehicle.

As shown in FIGS. 2 and 3, the airbag apparatus S includes in addition to the airbag 30 an inflator 14 for supplying the airbag 30 with inflation gas, a case 11 that houses the inflator 14 and airbag 30 in a folded state and has an opening 11b at the rear, and an airbag cover 22 covering the back side of the opening 11b of the case 11.

Unless otherwise specified, up/down, front/rear, and left/right directions in this specification are based on the state where the airbag apparatus S is mounted on a vehicle, and are therefore intended to refer to up/down, front/rear, and left/right directions of the vehicle.

The case 11 is made of sheet metal and is located below the steering column 1 to serve as a housing of the folded-up airbag 30 as shown in FIGS. 2 and 3. The case 11 is formed into a generally rectangular parallelepiped box shape including a generally square tubular circumferential wall 11a provided at the rear end with the opening 11a and a bottom wall 11f that closes off the front end of the circumferential wall 11a. The circumferential wall 11a is provided on its sections opposing in a vertical direction with a plurality of hooks 11c and projections 11d that are used to connect later-described joint walls 25 and 26 of the airbag cover 22 to the case 11. The hooks 11c located on the upper side retain the upper joint wall 25 of the airbag cover 22 whereas the projections 11d located on the lower side are inserted through the lower joint wall 26 and retain the wall 26 together with a holding member 12 that holds the underside of the joint wall 26 upward and fastens the projections 11d in a locking-bar fashion. A lateral of the circumferential wall 11a, the right side wall in the illustrated embodiment as shown in FIG. 3, is provided with a through hole 11e for receiving an end portion of a body 15 of the inflator 14 having a connector 19. Moreover, the bottom wall 11f includes two mounting holes 11g for receiving mounting bolts 17 of the inflator 14.

The holding member 12 is made of sheet metal and has an L-shaped section. The member 12 is secured to the bottom wall 11f of the case 11 with the mounting bolts 17 of the inflator 14 so as to hold the underside of the joint wall 26 upward.

The case 11 is mounted on the vehicle body structure utilizing two brackets 10 secured to the circumferential wall 11a.

Referring to FIGS. 2 and 3, the airbag cover 22 is fabricated of thermoplastic elastomer of olefin or the like. It covers the rear of the case 11 and is assembled with the case 11. The airbag cover 22 is located on a lower panel 9b of the dashboard 9 that is comprised of an upper panel 9a and lower panel 9b as shown in FIG. 11. The airbag cover 22 includes at the rear of the opening 11a of the case 11 two doors 23 openable respectively upward and downward about integral hinges 23a. Around the doors 23 are cover walls 24 and joint walls 25 and 26 extending forward to surround the circumferential wall 11a of the case 11. The cover walls 24 are arranged to cover laterals of the circumferential wall 11a whereas the joint walls 25 and 26 cover top and bottom of the circumferential wall 11a. Each of the joint walls 25 and 26 includes a plurality of apertures 25a and 26a for receiving the above-described hooks 11c and projections 11d of the case 11 for engagement with the case 11 (FIG. 2).

The inflator 14 is columnar in shape and is so arranged that its axis extends along a left and right direction of the vehicle as shown in FIGS. 2 and 3. It includes a generally columnar body 15 and a generally cylindrical diffuser 16 mounted around the body 15. The body 15 is provided on the first end (or left end, in the illustrated embodiment) with a plurality of gas discharge ports 15a while being provided on the second end (or right end) with a connector 19 connected with a lead wire 20 for feeding an actuating signal. The diffuser 16 is made of sheet metal and includes a plurality of (two, in the illustrated embodiment) mounting bolts 17 projecting forward, a clamping portion 16a that holds down and mounts the body 15 onto the bottom wall 11f of the case 11 when fastening the mounting bolts 17 into nuts 18 through the bottom wall 11f; and a plurality of gas outlets 16b for releasing inflation gas G exited the gas discharge ports 15a of the body 15 rearward.

The inflator 14 is operable simultaneously with an unillustrated airbag apparatus mounted on the steering wheel 7 in response to an actuating signal fed via the lead wire 20 when a circuit for activating airbag apparatuses detects a frontal collision of vehicle.

Out of a plurality of gas outlets 16b of the diffuser 16, the leftmost outlet 16bc is configured larger than remaining outlets 16b. Most of inflation gas G exited the gas discharge ports 15a of the inflator body 15 flows into the airbag 30 via the leftmost outlet 16bc.

The mounting bolts 17 of the diffuser 16 project from later-described mounting holes 32a of the airbag 30 when the airbag 30 is folded up while housing the inflator 14 there inside, and is fastened into the nuts 18 when the airbag 30 is stored inside the case 11 such that the bolts 17 project from the case 11. Thus the bolts 17, together with the inflator 14, serve as means for mounting the airbag 30 on the case 11.

Figure 4:
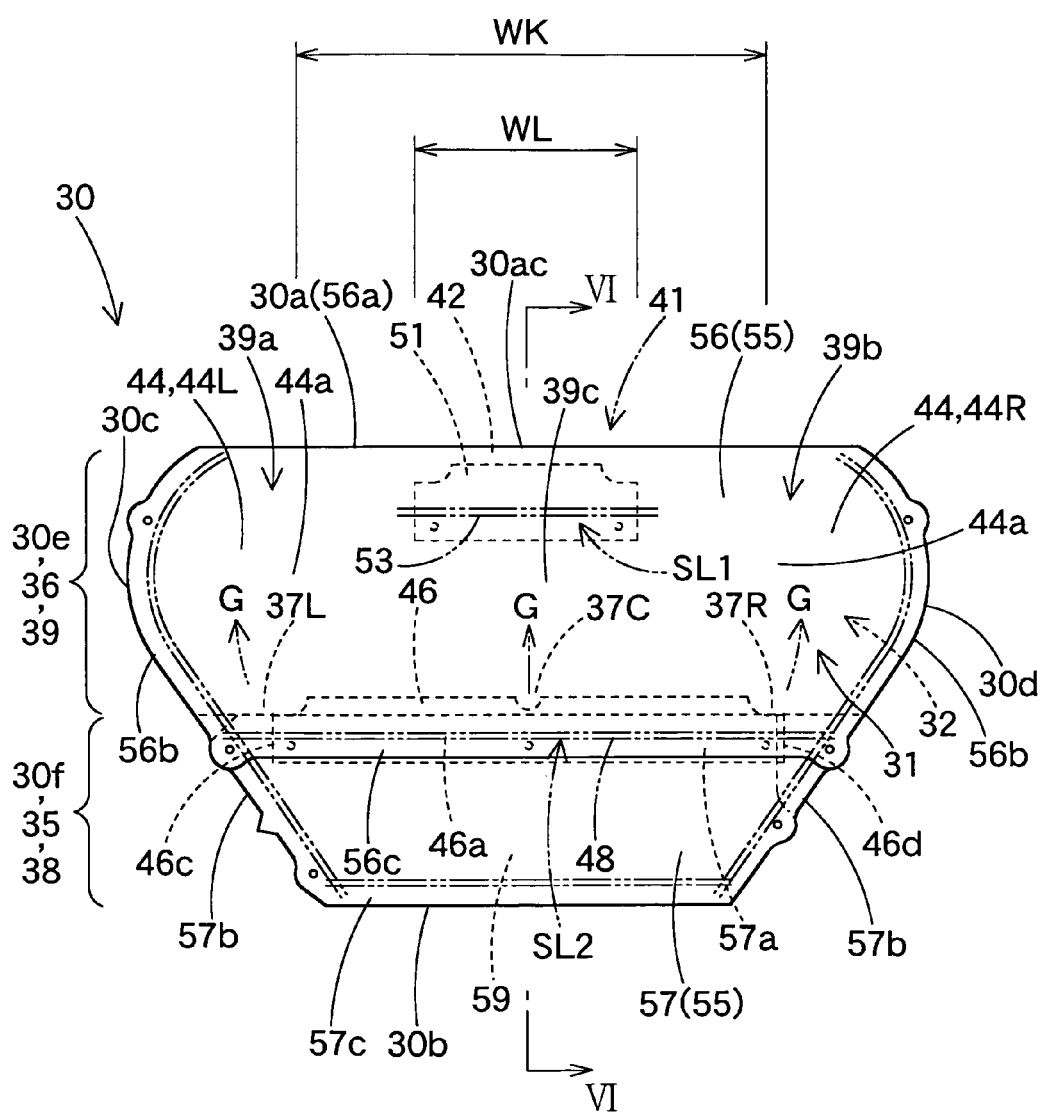
FIG. 4 is a front view of the airbag embodying the invention.
Figure 5:
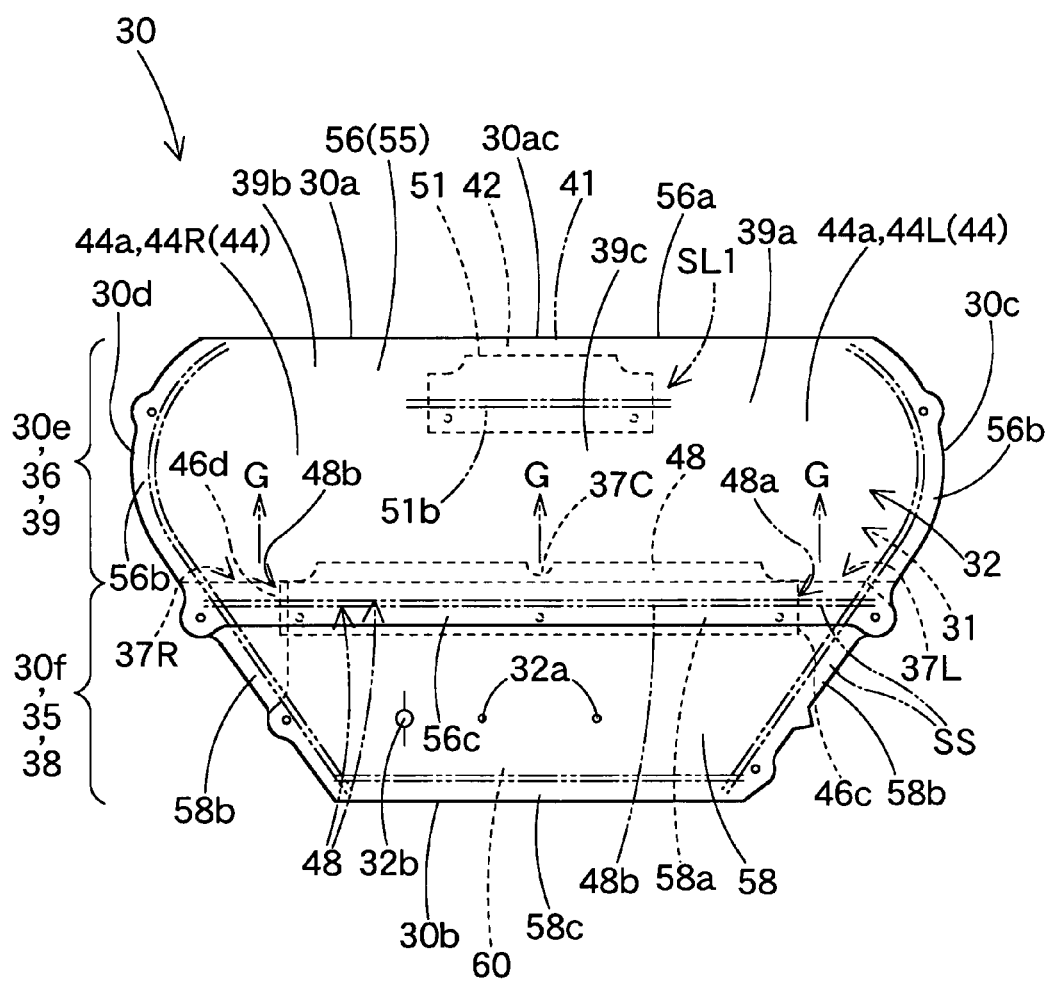
FIG. 5 is a back view of the airbag of FIG. 4.
Figure 6:
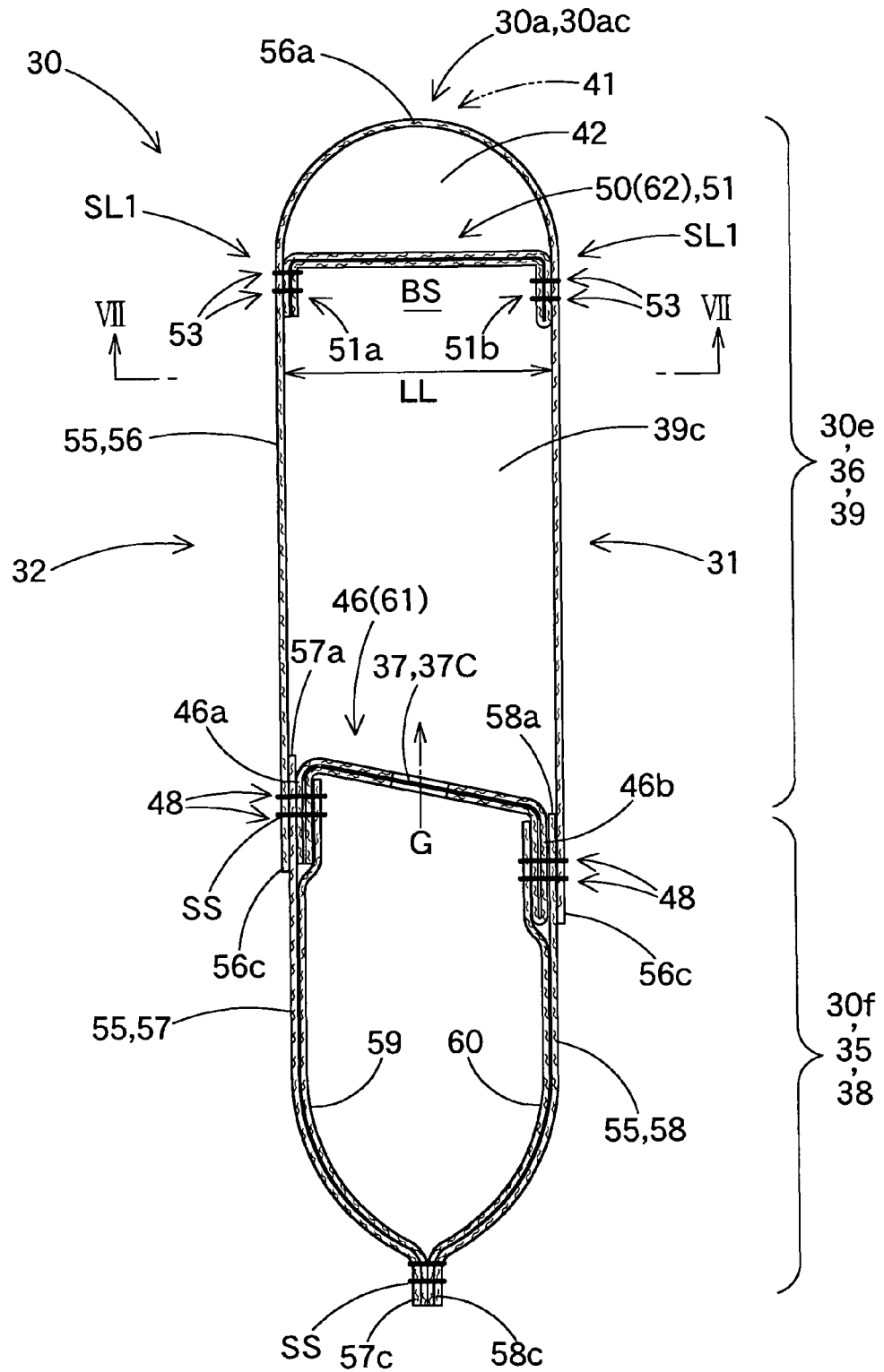
FIG. 6 is a vertical section of the airbag taken along line VI-VI of FIG. 4, illustrating a state where a driver-side wall and a column cover side wall are separated from each other.

The airbag 30 is formed of flexible woven fabric of polyester, polyamide or the like. As shown in FIGS. 4 to 6, the airbag 30 at full inflation is formed into such a contour as a home plate whose lower part has a reduced width. As indicated by double-dashed lines in FIG. 1, the airbag 30 includes a driver-side wall 31 deployable toward a driver D and a column cover side wall 32 continuing from an outer edge of the driver-side wall 31 and deployable toward the column cover 5 in front of and facing the driver-side wall 31. The airbag 30 is a planar airbag wherein the driver-side wall 31 and column cover side wall 32 are identical in outer contour. As shown in FIG. 3, the airbag 30 includes on the column cover side wall 32 at the bottom region 30b apertures 32a for receiving the mounting bolts 17 of the inflator 14 and an aperture 32b for receiving the end region of the inflator body 15 having the connector 19.

Figure 8:
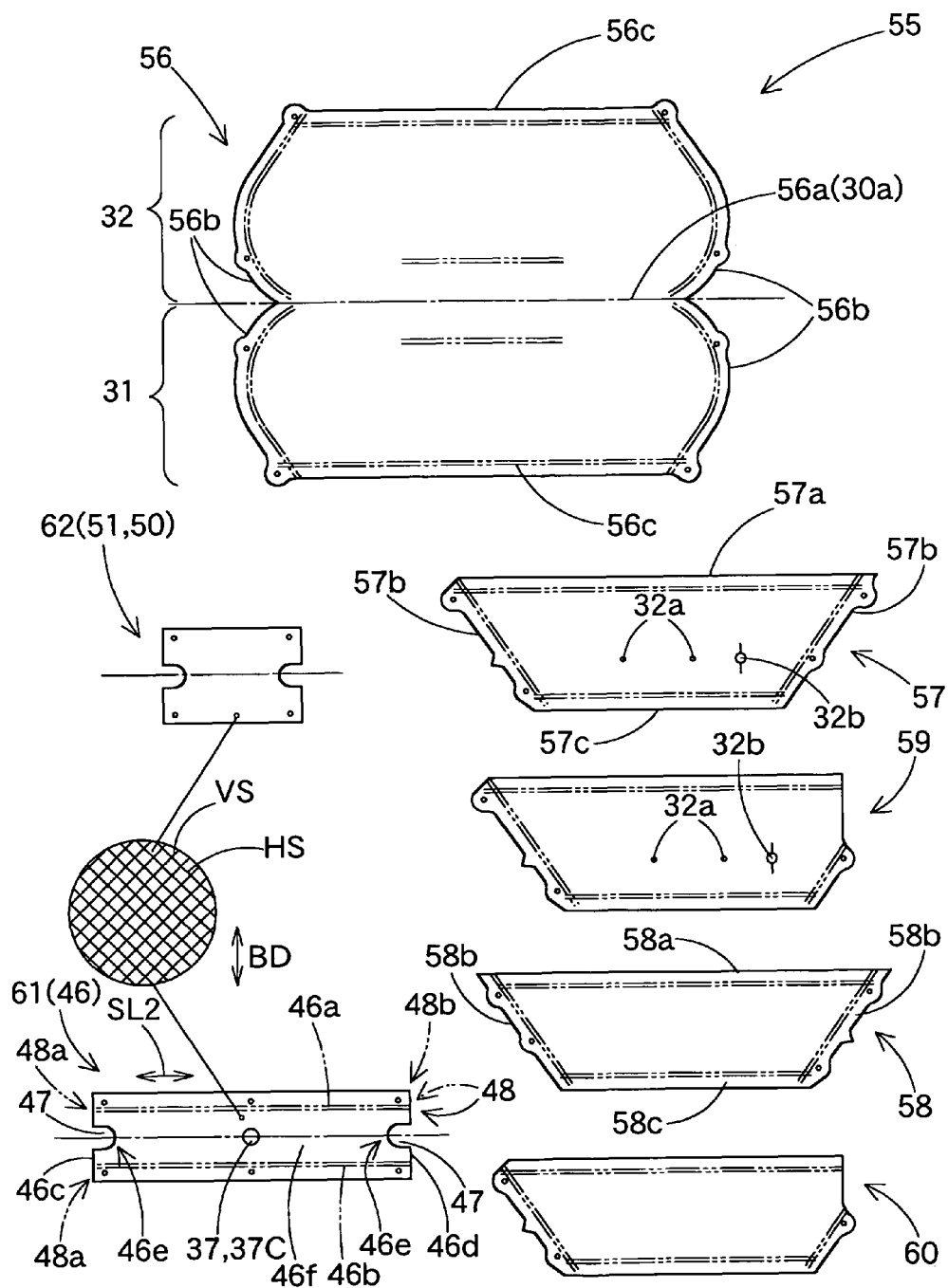
FIG. 8 illustrates materials of the airbag of FIG. 4 by plan views.

As shown in FIGS. 6 and 8, the airbag 30 includes as materials of its outer wall 55; an upper panel 56 that is doubled up at the upper edge 30a of the airbag 30 and constitutes upper regions of the driver-side wall 31 and column cover side wall 32; a lower front panel 57 that forms a lower region of the column cover side wall 32 and a lower rear panel 58 that forms a lower region of the driver-side wall 31. The materials further includes a front reinforcing cloth 59 and a rear reinforcing cloth 60 respectively reinforcing the lower panels 57 and 58 and tether cloths 61 and 62 that respectively form later-described thickness-regulating tether 46 and recess-forming tether 51. These materials are formed of flexible fabric woven by polyester, polyamide yarns or the like.

Each of the lower front panel 57 and lower rear panel 58 may be formed of further split panels split in a vertical direction.

Figure 12:
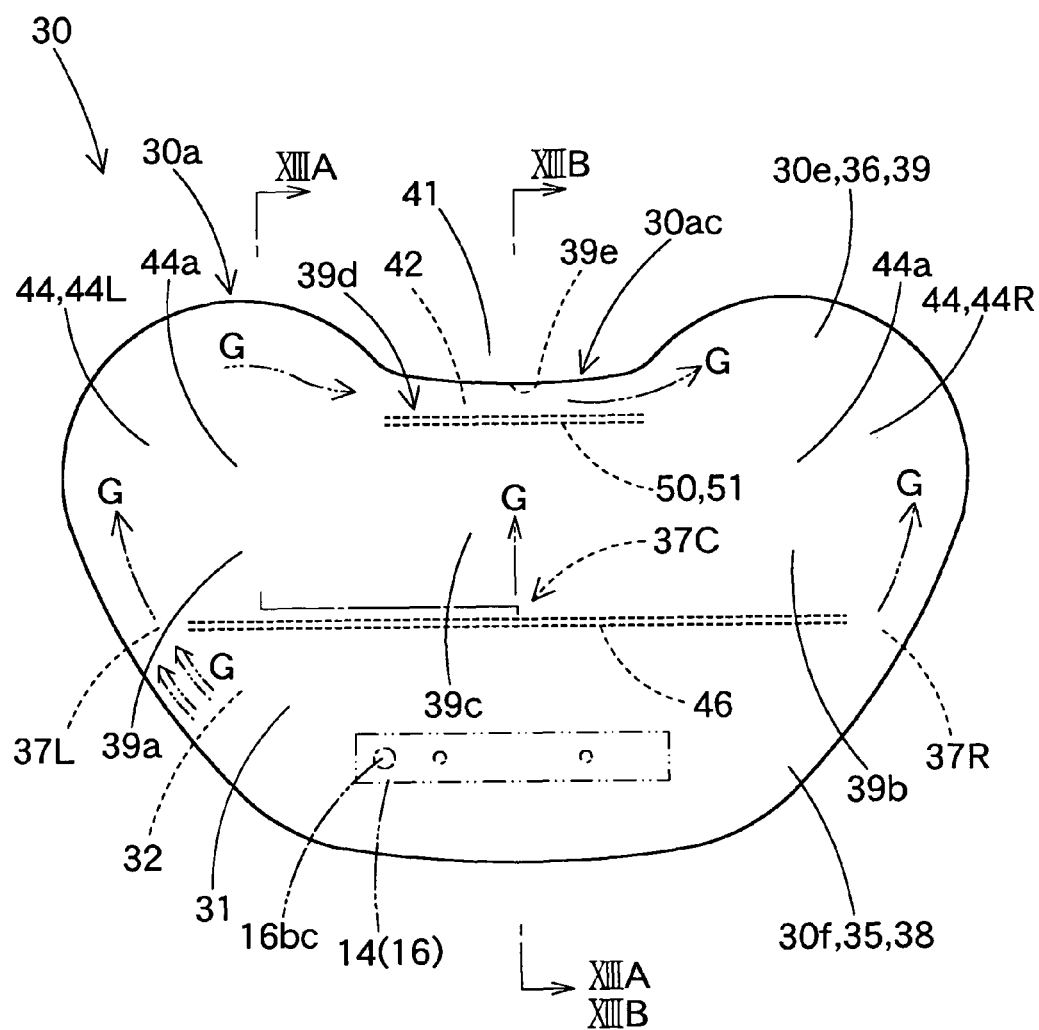
FIG. 12 is a front view of the airbag of FIG. 4 as inflated by itself.
Figure 13:
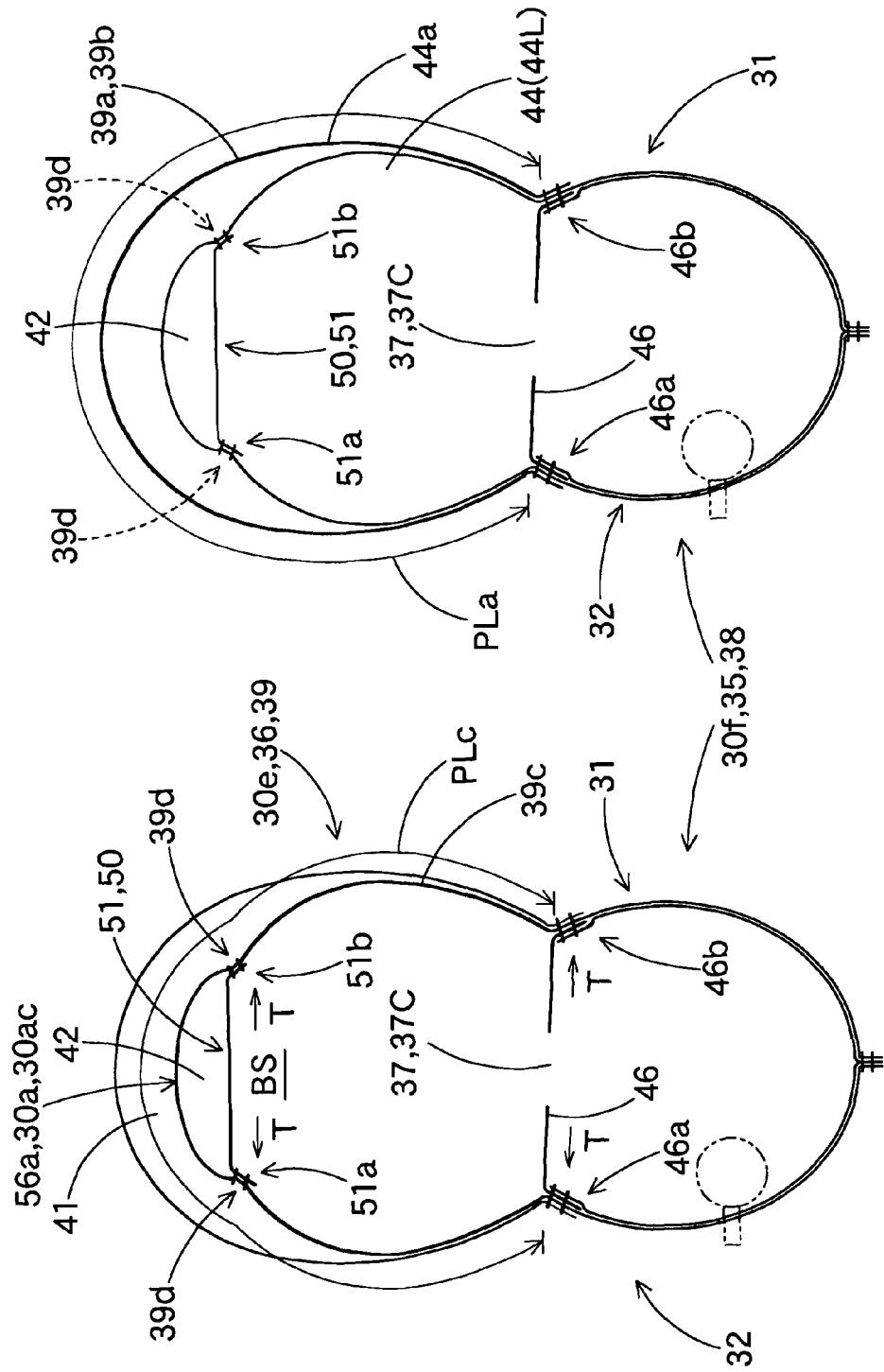
FIG. 13A is a schematic sectional view of the airbag of FIG. 4 inflated by itself taken along line XIIIA-XIIIA of FIG. 12.
FIG. 13B is a schematic sectional view of the airbag of FIG. 4 inflated by itself taken along line XIIIB-XIIIB of FIG. 12.

Referring to FIGS. 12, 13A and 13B, the airbag 30 includes on the left and right of the upper region 30e at full inflation knee-arresting portions 44 (44L, 44R) that are inflatable to have enough thicknesses for cushioning left and right knees K of a driver D. Beneath and between the knee-arresting portions 44L and 44R a thickness regulating tether 46 that connects the driver-side wall 31 and column cover side wall 32 for helping shape the airbag 30 in a plate-like fashion at full inflation.

The thickness regulating tether 46 has a band shape and is arranged to extend along a left and right direction inside the airbag 30 as shown in FIGS. 4 to 6. The tether 46 is sewn to the column cover side wall 32 and driver-side wall 31 of the airbag 30 respectively at the front end 46a and rear end 46b such that gaps are formed between left and right edges 46c and 46d and the left edge 30c and right edge 30d of the airbag 30. These gaps together with an opening formed at the center in a left and right direction of the tether 46 form gas outlet ports 37 (37L, 37C and 37R) that allow inflation gas G to flow upward.

That is, the tether 46 partitions the airbag 30 into two; an upper inflatable chamber 39 and a lower inflatable chamber 38 as shown in FIGS. 4 to 6. The lower inflatable chamber 38 located on the lower region 30f of the airbag 30 forms an upstream portion 35 in the inflation gas channel since it houses the inflator 14, whereas the upper inflatable chamber 39 located on the upper region 30e of the airbag 30 forms a downstream portion 36 in the inflation gas channel that admits inflation gas G from the upstream portion 35 via the gas outlet ports 37.

In the illustrated embodiment, the knee-arresting portions 44L and 44R are located above the thickness regulating tether 46 in the upper inflatable chamber 39 (downstream portion 36). As shown in FIGS. 12 and 13A, the knee-arresting portions 44L and 44R are designed such that central regions 44a of the knee-arresting portions 44L and 44R, which have greatest thicknesses in an anteroposterior direction at full inflation, are located above the left edge 46c and right edge 46d of the tether 46 and on a middle position between the tether 46 and the upper end 30a of the airbag 30.

As described above, the outer wall of the upper region 30e of the airbag 30 including the knee-arresting portions 44, in other words the outer wall of the upper inflatable chamber 39, is comprised of the upper panel 56 made of a flexible fabric as shown in FIGS. 5 to 8. The upper panel 56 is doubled at the location of the upper edge 30a of the airbag 30 at full inflation so as to form a straight turn crease 56a on its entire area in a left and right direction as shown in FIG. 8. Subsequently the upper panel 56 is sewn to upper edges 57a and 58a of the lower front panel 57 and lower rear panel 58 by the lower edges 56c having the front end 46a and rear end 46b of the thickness regulating tether 46 sewn together. Then if lateral edges 56b of the upper panel 56 are sewn together, the outer wall of the upper inflatable chamber 39 is formed.

Figure 7:
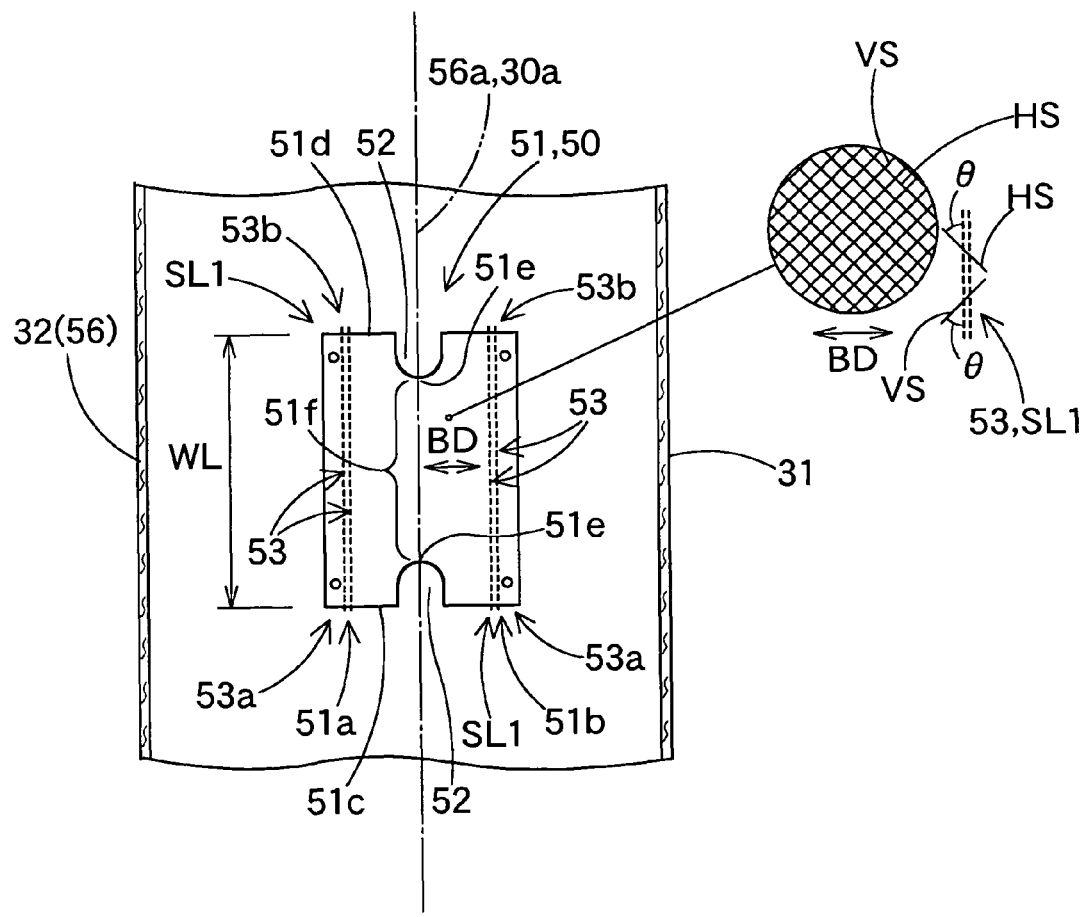
FIG. 7 illustrates sewing lines that saw the recess-forming tether to the driver-side wall and column cover side wall as the tether is spread out, which is viewed from line VII-VII of FIG. 6.

As shown in FIGS. 5 to 7, the airbag 30 further internally includes proximate the upper end 30a and in the vicinity of the center in a left and right direction a recess-forming tether 51 that acts as a connecting member 50 connecting the driver-side wall 31 and column cover side wall 32. The recess-forming tether 51 helps form an accommodation recess 41 at the center in a left and right direction of the upper edge 30a of the airbag 30 that recesses downward for accommodation of the underside 5a of the column cover 5 at full inflation of the airbag 30 (FIGS. 12 and 13B).

As shown in FIGS. 6 and 7, the recess-forming tether 51 has a band shape and is arranged to extend along a left and right direction inside the airbag 30. The tether 51 is connected to the column cover side wall 32 and driver-side wall 31 of the airbag 30 by the front end 51a and rear end 51b by sewn seams 53. The seams 53 are formed of sewing lines SL1 extending along a left and right direction. The tether 51 is provided on each of lateral edges (left edge 51c and right edge 51d) with a cutout portion 52 that recesses in a semicircular shape toward the center in a left and right direction of the tether 51. As shown in FIG. 7, left and right terminals 53a and 53b of the sewn seams 53 are located outward in a left and right direction relative to the bottoms 51e of the cutout portions 52 that recess deepest toward the center in a left and right direction of the tether 51.

As shown in FIGS. 4 to 6, the recess-forming tether 51 acting as the connecting member 50 are arranged such that the front end 51a and rear end 51b connected to the walls 32 and 31 of the airbag 30 are located at higher level relative to the front end 46a and rear end 46b of the thickness regulating tether 46 connected to the walls 31 and 32. Moreover, the tether 51 is so located as to form a communication passage 42 between the tether 51 and the upper edge 30a of the airbag 30 that allows inflation gas G to flow through in a left and right direction. The length LL in an anteroposterior direction of the recess-forming tether 51 (FIG. 6) is so determined that the central region 30ac of the upper end 30a of the airbag 30 is suppressed from extending upward and recesses downward to form the accommodation recess 41 at full inflation of the airbag 30.

That is, although the total film length PLc (FIG. 13B) of the driver-side wall 32 and column cover side wall 31 above the thickness regulating tether 46 at the central region 39c of the upper inflatable chamber 39, where the tether 51 is located, and the total film length PLa (FIG. 13A) of the walls 31 and 32 above the thickness regulating tether 46 at the left and right regions 39a and 39b of the upper inflatable chamber 39, where the knee-arresting portions 44L and 44R are located, are the same, the central region 39c is provided with the tether 51 that connects the walls 31 and 32 in such a manner as to form tucks 39 pulling the walls inward along an anteroposterior direction as shown in FIG. 13B. Therefore the central region 39c is suppressed from extending upward and forms into the accommodation recess 41 at full inflation of the airbag 30 as shown in FIGS. 11 and 12.

In the illustrated embodiment, the sewing lines SL1 of the seams 53 connecting the recess-forming tether 51 to the walls 31 and 32 of the airbag 30 are each comprised of double lines separate from each other and extending in parallel in a left and right direction as shown in FIGS. 4, 5 and 7.

The recess-forming tether 51 is formed by doubling up a tether cloth 62 which is made of a plain-weave fabric woven by warps VS and wefts HS of polyamide, polyester or the like (FIG. 6). The tether 51 is so prepared and sewn to the walls 31 and 32 of the airbag 30 that the sewing lines SL1 extend generally perpendicularly to the bias direction BD of the fabric (FIG. 7), i.e. the sewing lines SL1 extend generally at 45° to the warps VS and wefts HS of the tether cloth 62.

In the illustrated embodiment, the thickness regulating tether 46 as well is provided on each of lateral edges (left edge 46c and right edge 46d) with a cutout portion 47 that recesses in a semicircular shape toward the center in a left and right direction of the tether 46, as shown in FIG. 8. Left and right terminals 48a and 48b of sewn seams 48 that connect the front end 46a/rear end 46b of the tether 46 to the walls 31 and 32 of the airbag 30 are located outward in a left and right direction relative to bottoms 48e of the cutout portions 47 that recess deepest toward the center in a left and right direction of the tether 46. Each of the seams 48 is formed by a sewing line SL2 comprised of double stitch, too (FIG. 8). The thickness regulating tether 46 is also formed by doubling up a tether cloth 61 which is made of a plain-weave fabric woven by warps VS and wefts HS of polyamide, polyester or the like. (FIG. 6), by bias cutting, such that the sewing lines SL2 to the walls 31 and 32 of the airbag 30 extend generally perpendicularly to the bias direction BD of the tether cloth 61 (FIG. 7).

The airbag 30 is manufactured as follows: Firstly the upper panel 56 is doubled at the turn crease 56a and the front end 51a and rear end 51b of the recess-forming tether 51 are sewn to predetermined locations on the upper panel 56 which are to be the column cover side wall 32 and driver-side wall 31 of the airbag. Each of the lower front panel 57 and lower rear panel 58 is preliminarily lined with the front reinforcing cloth 59/rear reinforcing cloth 60. The upper panel 56 is then sewn to the upper edges 57a and 58a of the lower front panel 57 and lower rear panel 58 provided with the reinforcing cloths 59 and 60 by the lower edges 56c having the front end 46a and rear end 46b of the thickness regulating tether 46 sewn together. Then if the lateral edges 56b of the upper panel 56, lateral edges 57b and 58b and then lower edges 57c and 58c of the lower panels 57 and 58 are sewn together, the airbag 30 is completed.

When the airbag 30 is completed, the diffuser 16 is inserted into the airbag 30 via the above-described aperture 32b such that the mounting bolts 17 project out of the aperture 32a, and then the airbag 30 is folded up. Specifically, the airbag 30 is folded up in such a manner as to bring the upper edge 30a close to the lower edge 30b so the airbag 30 emerges from the case 11 and deploys rearward and upward upon deployment, whereas the left edge 30c and right edge 30d are folded toward the center in a left and right direction of the airbag 30.

Subsequently, the folded-up airbag 30 is wrapped by a breakable wrapping member except areas of the mounting bolts 17 and apertures 32b, and then is set in the case 11 such that the mounting bolts 17 project out of the bottom wall 11f of the case 11. Then the airbag cover 22 is assembled with the case 11 by having the hooks 11b and projections 11c of the case 11 engaged with the joint walls 25, 26 of the airbag cover 22, using the holding member 12 to hold down the joint wall 26 onto the circumferential wall 11a, and fastening the mounting bolts 17 with the nuts 18. Thereafter, the inflator body 15 is inserted into the airbag 30 through the through hole 11e of the circumferential wall 11a of the case 11 and the aperture 32b of the airbag 30, and then the nuts 18 are further forcibly fastened so that the diffuser 16 grips the inflator body 15. Thus the assembling of the knee-protecting airbag apparatus S is completed. Thereafter, if the case 11 is mounted on the vehicle body structure utilizing the brackets 10 while connecting the connector 19 provided with the lead wire 20 extending from the airbag activating circuit which has been mounted on the vehicle to the inflator body 15, the airbag apparatus S is mounted on the vehicle.

After the airbag apparatus S is mounted on the vehicle, if an actuating signal is fed to the inflator body 15 via the lead wire 20, inflation gas G is discharged from the gas discharge ports 15a of the inflator 14 and flows into the airbag 30 via the gas outlets 16b of the diffuser 16 as shown in FIG. 3. Then the airbag 30 inflates and breaks the wrapping member (not-shown), pushes and opens the doors 23 of the airbag cover 22 upward and downward, so that the airbag 30 emerges from the opening 11b of the case 11 and deploys rearward and upward in such a manner as to cover the underside 5a of the column cover 5, which extends obliquely upward and rearward, for protecting knees K of a driver D as shown in FIGS. 9 and 10.

Figure 9:
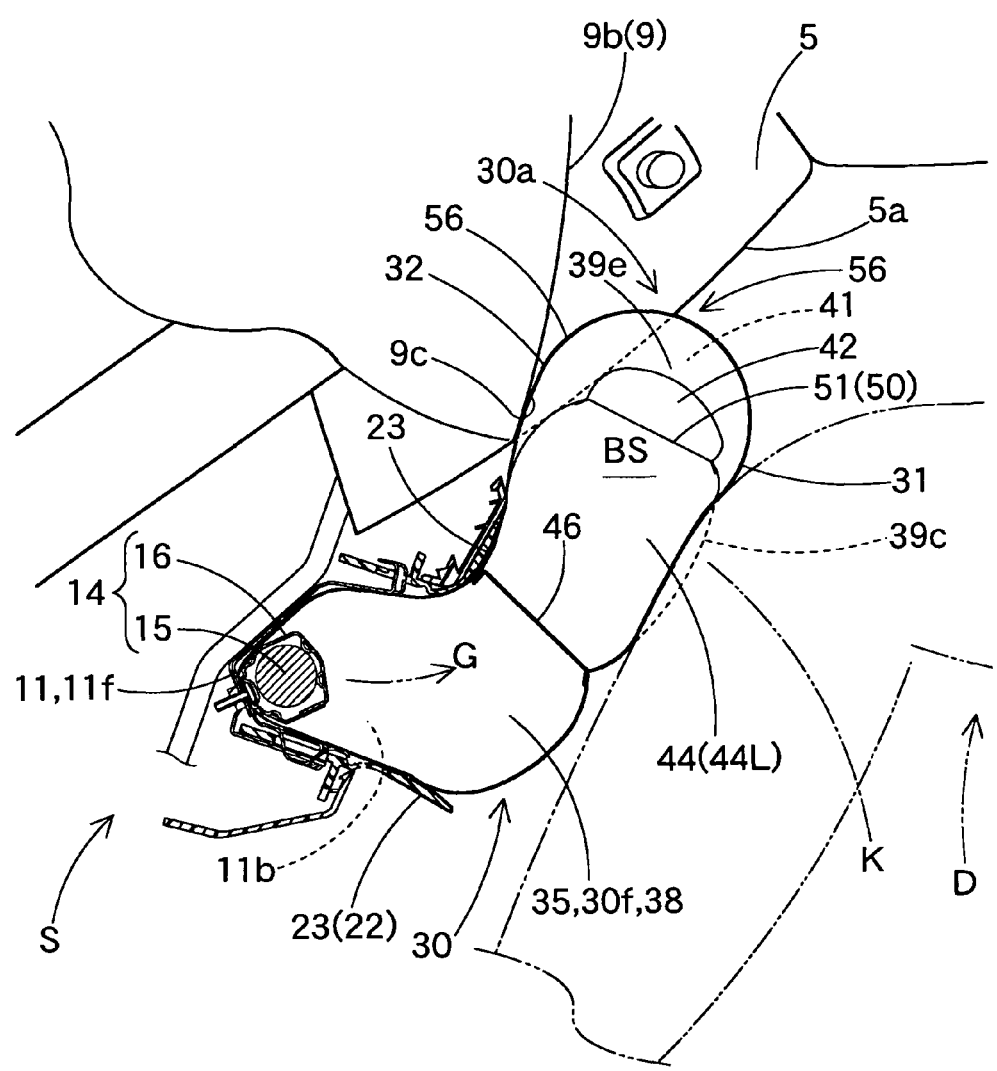
FIG. 9 is a vertical section of the airbag of FIG. 4 at full inflation as is mounted on a vehicle, taken generally along line IX-IX of FIG. 11.

Since the airbag 30 includes the accommodation recess 41 that accommodates the underside 5a of the column cover 5 at full inflation, the central region 39c of the upper inflatable chamber 39 does not protrude toward knees K, and the left and right knee-arresting portions 44 stay close to the rear surface 9c of the lower panel 9b as shown in FIGS. 9 and 11. Accordingly, the knee-arresting portions 44, being supported by the rear surface 9c of the lower panel 9b, swiftly cushion knees K of a driver D even if the knees K had already been close to the lower panel 9.

Figure 10:
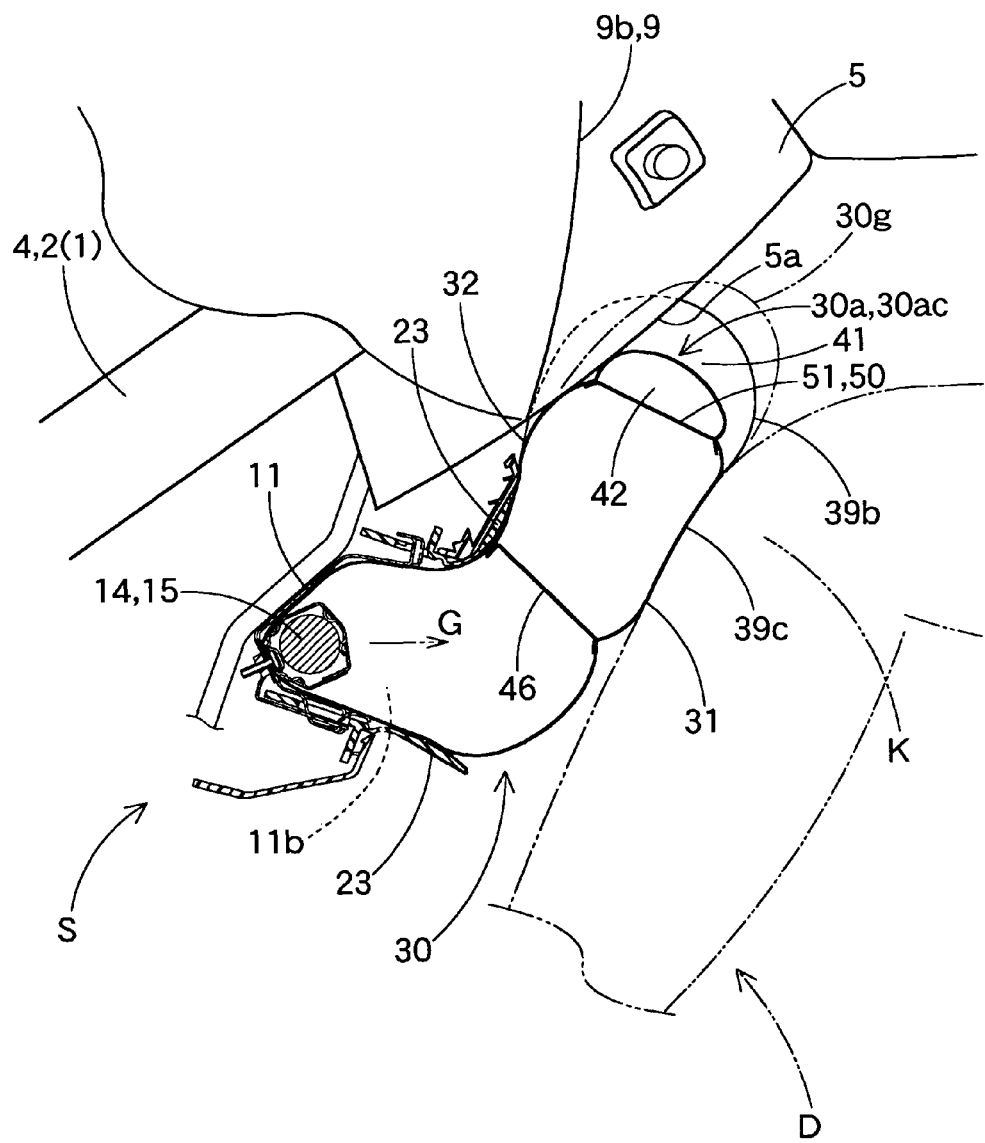
FIG. 10 is a vertical section of the airbag of FIG. 4 at full inflation as is mounted on a vehicle, taken generally along line X-X of FIG. 11.

Moreover, even in the event that the knees K are dislocated toward the central region 39c of the upper inflatable chamber 39 when approaching the lower panel 9b, it is prevented that the central region 39c pushes the column cover 5 and deforms the column body 2 in such a manner as to push up the column cover 2 since the airbag 30 does not include on the upper edge 30a a portion 30g indicated by double-dashed lines in FIGS. 10 and 11, which the airbag 30 would have on the location of the accommodation recess 41 but for the recess 41.

In the airbag 30 of the foregoing embodiment, the accommodation recess 41 can be formed only by doubling up the upper panel 56 on the turn crease 56a and connecting the driver-side wall 31 and column cover side wall 32 by the connecting member 50 below the turn crease 56a and above the thickness regulating tether 46. That is, although the total film length PLa of the walls 31 and 32 above the thickness regulating tether 46 at the location of the knee-arresting portion 44 (on the left and right regions 39a and 39b of the upper inflatable chamber 39) and the total film length PLc of the walls 31 and 32 above the thickness regulating tether 46 at the location of the accommodation recess 41 (in the central region 39c of the upper inflatable chamber 39) are the same as shown in FIGS. 13A and 13B, the connecting member 50 or recess-forming tether 51 as described above connects the walls 31 and 32 in such a manner as to tuck the walls 31 and 32 in an anteroposterior direction, such that the walls 31 and 32 are prevented from free expansion and the central region 30ac of the upper end 30a of the airbag 30 is suppressed from extending upward and forms into the accommodation recess 41 at full inflation of the airbag 30.

Since the accommodation recess 41 is formed only by doubling up the upper panel 56 on the turn crease 56a and connecting the driver-side wall 31 and column cover side wall 32 at a predetermined location above the thickness regulating tether 46 by the connecting member 50, the airbag 30 can be manufactured without applying double stitch to a curved upper edge of the airbag as is conventionally done.

Moreover, the airbag 30 does not include any seams on the upper edge 30a unlike conventional airbags that are manufactured by connecting the driver-side wall and column cover side wall together by outer peripheral edges, since the airbag 30 is formed by the upper panel 56 that is doubled up on the turn crease 56a. Therefore, the airbag 30 has increased airtightness.

The accommodation recess 41 forms a projecting portion 39e inside the upper edge 30a of the airbag 30 (FIGS. 9 and 12) upon airbag inflation. Since this projecting portion 39e is comprised only of the turn crease 56a extending in a left and right direction, it is hardly resistant to the flow of inflation gas G. Furthermore, since the connecting member 50 is arranged inside the airbag 30 to form the communication passage 42 between the connecting member 50 and the turn crease 56a that allows inflation gas G to flow through in a left and right direction, the inflation gas G smoothly flows in a left and right direction along the upper edge 30a of the airbag 30. As a result, even in the event that the inflator 14 has the gas discharge ports 15a at one side in a left and right direction in the upstream portion 35, i.e., on the left in the illustrated embodiment, as shown in FIG. 3, and the gas G flows into the downstream portion 36 from one side (from the left) of the upstream portion 35 as shown in FIG. 12, the gas G flows smoothly in a left and right direction, i.e. from the left to right, in the illustrated embodiment, along the upper edge 30a of the airbag 30. Therefore, the upper end 30a region of the airbag 30 unfurls and inflates as bilaterally evenly as possible.

Therefore, the airbag 30 embodying the invention is easy to manufacture and is inflatable in a bilaterally balanced manner even in the event that the gas source is located on one side in a left and right direction.

The connecting member 50 in the foregoing embodiment is comprised of the recess-forming tether 51 that is connected to the driver-side wall 31 and column cover side wall 32 by front and rear edges 51a and 51b such that the driver-side wall 31 and column cover side wall 32 are separate from each other in an anteroposterior direction. This configuration provides a space BS for inflation between the driver-side wall 31 and column cover side wall 32 at the location of the connecting member 50 as shown in FIGS. 6, 9 and 13B, unlike an instance where the walls 31 and 32 are directly connected together, such that the knee-arresting portions 44 having a predetermined thickness are smoothly formed proximate the connecting member 50 or recess-forming tether 51.

In the foregoing embodiment, the recess-forming tether 51 is formed of the tether cloth 62 that is woven by warps VS and wefts HS. The sewn seams 53 that connect the front and rear edges 51a and 51b of the recess-forming tether 51 to the driver-side wall 31 and column cover side wall 32 are each comprised of the sewing line SL1 that extends along a left and right direction and generally perpendicularly to the bias direction BD of the tether cloth 62 (FIG. 7). Although a great tension force T acts on the recess-forming tether 51 in such a manner as to pull the tether 51 to the front and rear at airbag inflation, the tether 51 is prevented from tearaway because the sewing lines SL1 are arranged generally perpendicularly to the bias direction BD of the tether cloth 62, i.e. extend generally at 45° to the warps VS and wefts HS of the tether cloth 62, which allows stretching of the cloth 62 to some extent in an anteroposterior direction and cushioning of an abrupt tension force T.

The recess-forming tether 51 further includes on each of the left edge 51c and right edge 51d the cutout portion 52 that recesses toward the center in a left and right direction of the recess-forming tether 51 relative to opposite terminals 53a and 53b of the sewn seams 53 as shown in FIG. 7. Due to the cutout portions 52, upon airbag inflation, the tension force T trying to pull the tether 51 to the front and rear substantially acts on an area shown generally at numeral 51f in FIG. 7 that expands between the bottoms 51e of the cutout portions 52. Accordingly, the tension force T does not directly affects the terminals 53a and 53b of the sewn seams 53 since those terminals are located outward in a left and right direction relative to the bottoms 51e of the cutout portions 52. That is, stress concentration which would otherwise occur on the terminals 53a and 53b of the seams 53 due to the tension force T is mitigated and thereby improving the connecting strength of the recess-forming tether 51 to the walls 31 and 32 of the airbag 30.

Figure 14:
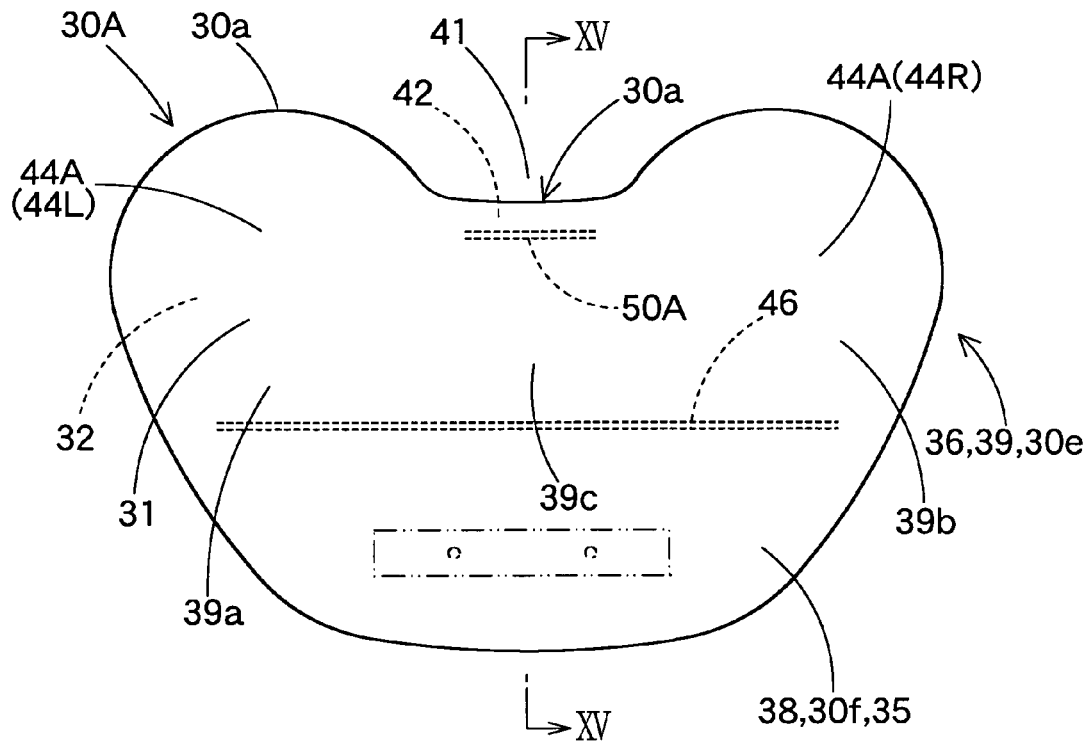
FIG. 14 is a front view of a modification of the airbag of the invention as inflated by itself.
Figure 15:
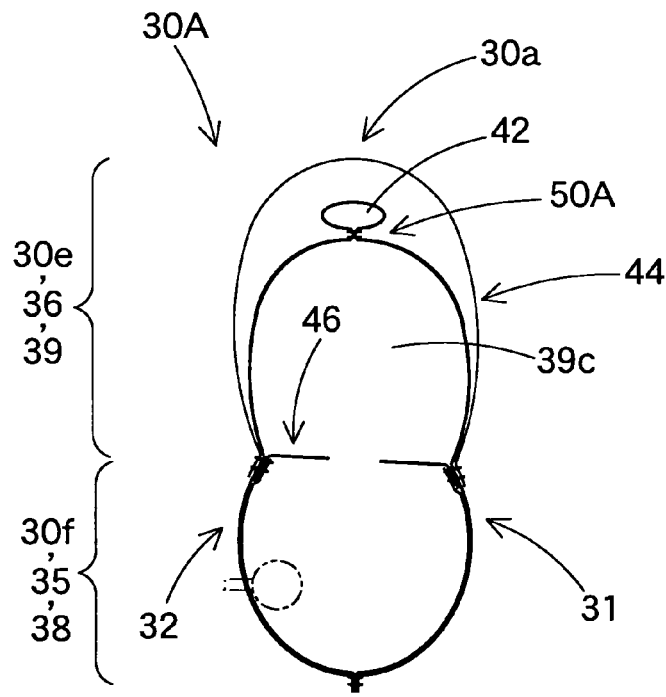
FIG. 15 is a sectional view of the airbag of FIG. 14 inflated by itself taken along line XV-XV of FIG. 14.

Although the recess-forming tether 51 or connecting member 50 in the foregoing embodiment has been described as is so arranged to form the space BS for inflation at the location of the connecting member 50, it will also be appreciated that the connecting member is comprised of sewing threads and/or adhesive that bring the walls 31 and 32 into direct contact with each other as in an airbag 30A illustrated in FIGS. 14 and 15. The connecting member 50A of the airbag 30A is formed of sewing threads that saw the driver-side wall 31 and column cover side wall 32 together. However, in such an instance where the walls 31 and 32 of the airbag 30 are connected into direct contact, an inflatable space cannot be formed between the walls 31 and 32 at the location of the connecting member 50A, and thus knee-arresting portions 44A will be thin in the vicinity of the connecting member 50A. In order to make the knee-arresting portions 44A thick enough in this instance, the airbag will have to be enlarged in width such that the knee-arresting portions will be located away from the connecting member 50A. This will go against downsizing of airbags.

An amount that the accommodation recess 41 recesses downward is determined by the length LL in an anteroposterior direction of the recess-forming tether 51 or connecting member 50. Specifically, as the length LL becomes shorter, the recessing amount becomes greater in reverse proportion to the length LL. Moreover, the accommodation recess 41 can be widened or narrowed in a left and right direction depending on the shape of the underside 5a of the column cover 5 by widening or narrowing the width WL (FIGS. 4 and 7) of the connecting member 50 in proportion to the width of the underside 5a of the column cover 5.

Nevertheless, the width WL of the connecting member 50A is desirably narrower than the distance WK (FIG. 4)

between the centers 44*a* of the knee-arresting portions 44L and 44R at full inflation of the airbag 30 so as to secure required thicknesses at the centers 44*a* of the knee-arresting portions 44.

The positions at which the front end 51*a* and rear end 51*b* of the recess-forming tether 51 are connected to the driver-side wall 31 and column cover side wall 32 may be lowered and away from the turn crease 56*a* so as to enlarge an opening area of the communication passage 42. However, locating the positions proximate the centers 44*a* of the knee-arresting portions 44 will thin the central areas 44*a* of the knee-arresting portions 44, and therefore, the front end 51*a* and rear end 51*b* of the recess-forming tether 51 are desirably located above the central areas 44*a* of the knee-arresting portions 44.

What is claimed is:

1. An airbag for knee protection adapted to be mounted on a low location in front of a driver's seat in a folded-up state for emergence from a housing and deployment upward and rearward when fed with inflation gas in such a manner as to cover an underside of a column cover extending obliquely upward and rearward, the airbag comprising:
    an upstream portion proximate a source of inflation gas, which is a lower region of the airbag at full deployment;
    a downstream portion apart from the source of inflation gas, which is an upper region of the airbag at full deployment;
    a driver-side wall, as part of an outer wall of the airbag, which is deployable toward the driver's seat;
    a column cover side wall, as part of the outer wall of the airbag, which is deployable toward the column cover;
    knee-arresting portions located on the left and right of the upper region of the airbag away from the gas source, the knee-arresting portions being inflatable to have enough thicknesses for cushioning left and right knees of a driver;
    a thickness regulating tether located beneath and between the knee-arresting portions, the tether connecting the driver-side wall and column cover side wall for helping shape the airbag in a plate-like fashion at full inflation;
    an accommodation recess located at the center in a left and right direction of an upper edge of the airbag at full inflation and recessing downward for accommodating the underside of the column cover;
    an upper panel formed of a flexible sheet material and being doubled on a turn crease that extends straightly through the panel in a left and right direction and forms the upper edge of the airbag and thereby constituting an outer wall of the upper region of the airbag; and
    a connecting member located beneath the turn crease and in the vicinity of the center in a left and right direction of the upper panel and above the thickness regulating tether, the connecting member approximating the driver-side wall and column cover side wall to each other so as to provide the accommodation recess and being arranged to form a communication passage between the connecting member and the turn crease that allows inflation gas to flow through in a left and right direction.

2. The airbag as set forth in claim 1 wherein the connecting member connects the driver-side wall and column cover side wall into direct contact with each other.

3. The airbag as set forth in claim 1 wherein the connecting member is a recess-forming tether that is connected to the driver-side wall and column cover side wall by front and rear edges such that the driver-side wall and column cover side wall are separate from each other in an anteroposterior direction.

4. The airbag as set forth in claim 3, wherein:
    the recess-forming tether is formed of a piece of fabric woven by warps and wefts;
    seams that connect the front and rear edges of the recess-forming tether to the driver-side wall and column cover side wall are each comprised of a sewing line that extends along a left and right direction and generally perpendicularly to the bias direction of the fabric forming the recess-forming tether; and
    the recess-forming tether includes on each of lateral edges a cutout portion that recesses toward the center in a left and right direction of the recess-forming tether relative to left/right terminals of the seams.

5. The airbag as set forth in claim 3 wherein the recess-forming tether is smaller in width in a left and right direction than a distance between centers of the knee-arresting portions at full inflation of the airbag.

6. The airbag as set forth in claim 5 wherein seams that connect the front and rear ends of the recess-forming tether to the driver-side wall and column cover side wall are located above the centers of the knee-arresting portions while securing an opening area of the communication passage.

7. The airbag as set forth in claim 1 wherein the outer panel of the airbag includes, in addition to the upper panel that constitutes upper regions of the driver-side wall and column cover side wall, a lower front panel that constitutes a lower region of the column cover side wall and a lower rear panel that constitutes a lower region of the driver-side wall.

* * * * *